W. H. McCOY.
Sun-Dial.
No. 165,746.
Patented July 20, 1875.
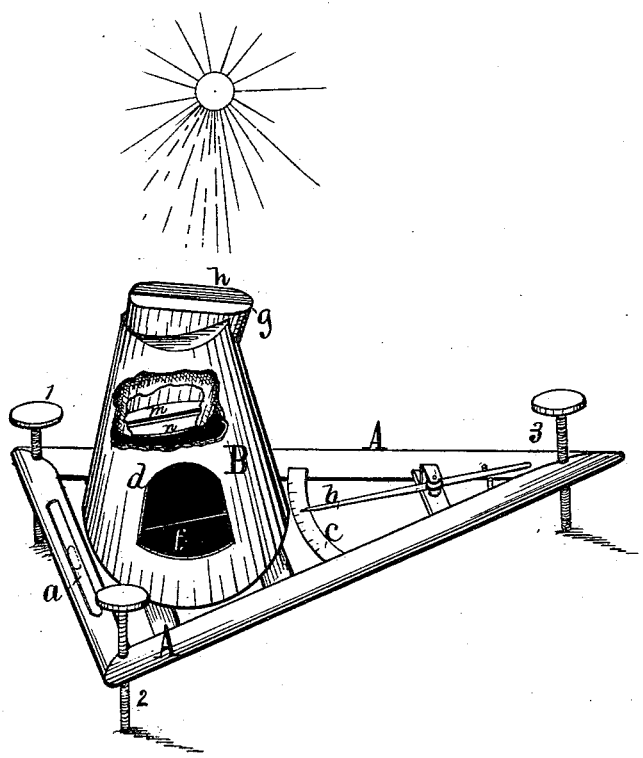

UNITED STATES PATENT OFFICE.

WILLIAM H. McCOY, OF DES MOINES, IOWA.

IMPROVEMENT IN SUN-DIALS.

Specification forming part of Letters Patent No. 165,746, dated July 20, 1875; application filed September 10, 1874.

*To all whom it may concern:*

Be it known that I, WILLIAM H. McCOY, of Des Moines, Polk county, Iowa, have invented a Transit Instrument, of which the following is a specification:

The object of my invention is to provide a simple, cheap, and practical instrument for determining and obtaining the precise point of time of the sun's transit of the meridian line. It consists in placing opaque shades in a tubular case to form a sun-dial, and mounting and combining the same with a magnetic needle and a level, as hereinafter fully set forth.

My drawing is a perspective view, illustrating the construction and operation of my invention.

A A represent a triangular frame forming the base or stand upon which my apparatus is mounted. It may vary in form and size, as desired. 1 2 3 are feet in the form of set-screws, for supporting, adjusting, and leveling the complete instrument. $a$ represents a spirit-level, inclosed or attached to the instrument in any suitable manner. $b$ represents a magnetic needle mounted upon suitable bearings, rigidly connected with the base A. $c$ is a dial, co-operating with the needle to indicate the position of the instrument relative to the equator or equinoctial line. B is a tubular and vertical case of a sun-dial. It may vary in form and size, as desired. $d$ represents an opening to a dark chamber in the lower end. $f$ represents an illuminated line across the bottom, caused by the sun's rays passing between two opaque half-section covers, diaphrams, deflectors, or shades in the upper portion of the case B. $g$ is an auxiliary case suspended in the top of the case B in such a manner as to close it. Its top plane angles and its form tapers downward to catch and converge the sun's rays. The left or east side of the top is covered with an opaque shade or cover, $h$. $m$ is a half-section diaphragm or bottom, corresponding in line with the top shade $h$, and prevents the light reflected from the open side of the case from passing to the dark chamber below. $n$ is a half-bottom on the opposite side of $m$ and lower down.

By fixing the shades in the case B the auxiliary case $g$ may be dispensed with.

In the practical operation of my instrument, it is placed on a suitable table or other even surface, and then adjusted, as required by the indications of the needle $b$, to have the straight edges of the shades $h$ and $n$ running due north and south, and in direct line with the equator. Next, level the instrument by adjusting the screw-feet 1 2 3 as required by the indications of the level $a$. In this position the shades $h$ and $n$ will prevent the sun's rays from entering the dark chamber in the case B until the sun attains the meridian, and his rays descend in a vertical line, and pass through the crevice or small open space which occurs between the edges of the shades $h$ and $n$. This can only occur during and after the sun's transit of the meridian, and the precise point of time will be plainly indicated by the appearance of the illuminated line $f$ in the dark chamber of the case B.

An accurate means is thus provided for ascertaining noon or midday and correct time.

I am aware that a sun-dial, magnetic needle, and level have been co-operated for similar purposes; but I claim that my manner of forming a sun-dial and transit instrument is new and greatly advantageous.

I claim as my invention—

The tubular case B, carrying shades $h$, $m$, and $n$, and having opening $d$, substantially as described, mounted upon an adjustable stand, A, provided with a level, $a$, and magnetic needle $b$, substantially as and for the purpose set forth.

WILLIAM H. McCOY.

Witnesses:
C. O. PERKINS,
M. D. McHENRY, Jr.